(No Model.)
J. W. ROGERS.
SOLE NAPPING MACHINE FOR BOOTS AND SHOES.
No. 250,002. Patented Nov. 22, 1881.
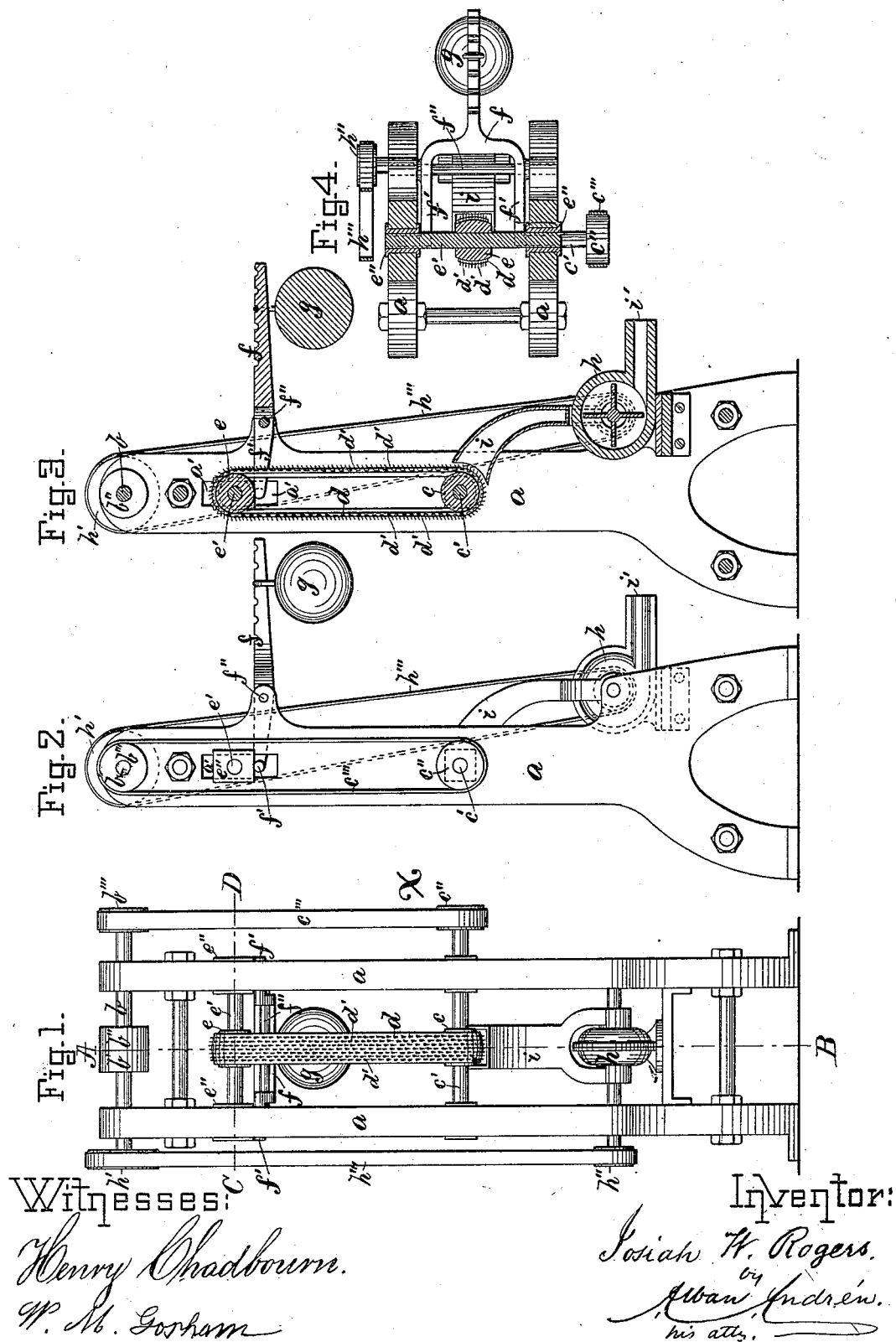
Witnesses:
Henry Chadbourn.
W. M. Gorham
Inventor:
Josiah W. Rogers.
by Alban Andrew.
his atty.

UNITED STATES PATENT OFFICE.

JOSIAH W. ROGERS, OF SALEM, MASSACHUSETTS.

SOLE-NAPPING MACHINE FOR BOOTS AND SHOES.

SPECIFICATION forming part of Letters Patent No. 250,002, dated November 22, 1881.

Application filed June 21, 1880. Renewed April 22, 1881. (No model.)

*To all whom it may concern:*

Be it known that I, JOSIAH W. ROGERS, a citizen of the United States, residing at Salem, in the county of Essex and State of Massachusetts, have invented certain new and useful Improvements in Napping-Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in boot and shoe sole nappers for the purpose of roughing and raising the fibers of the insoles and outer soles preparatory to uniting such roughened surfaces with the usual rubber cement, as required in the manufacture of what is generally termed "compo-shoes."

In carrying out my invention I employ an endless belt studded on its outer side with sharp points, wires, tacks, or projections, which belt is supported on a pair of rotary rollers, by means of which a rapid and endless rotation of the studded belt is obtained, thus enabling the operator to hold the part of the boot or shoe to be roughened against the endless rotating belt, by which the object sought to be attained is quickly accomplished. Nappers for this purpose have heretofore been made in the form of a rotary disk secured to a spindle; but as only a small portion of its outer circumference can be effectually employed, on account of the slow circumferential motion of the middle portion, such napper quickly wears out and has to be replaced by another, whereas in the present invention every part of the studded belt is equally useful for the purpose described, and, owing to its increased surface over the rotary disks above mentioned, it will last a much longer time.

Another advantage of this invention is that, as the endless belt is readily yielding where not supported by its rollers, any curvature of the soles or shanks or other parts of the shoes can be instantly napped, if held against the belt at a place about midway between its rollers. I prefer to make the endless studded belt of card-clothing, but do not wish to confine myself to this particular kind of material for the belt, as it may be made of other suitable material studded over with tacks or other suitable sharp projections without departing from the spirit of my invention.

The invention is carried out as follows, reference being had to the accompanying drawings, on which—

Figure 1 represents a front elevation; Fig. 2, an end view, seen from X in Fig. 1. Fig. 3 represents a longitudinal section on the line A B, shown in Fig. 1; and Fig. 4 represents a cross-section on the line C D, also shown in Fig. 1.

Similar letters refer to similar parts wherever they occur on the different parts of the drawings.

$a\ a$ are the frames or uprights that serve as bearings for the upper driving-shaft, $b$, on which $b'$ is a fast and $b''$ a loose pulley.

$c$ is the lower crown-pulley for supporting and driving the endless studded belt $d$, having projections $d'\ d'\ d'$, as and for the purpose set forth.

$e$ is the upper crown-pulley for supporting said endless studded belt.

$c'$ is the shaft for the pulley $c$, which shaft is located in stationary bearings in the frames $a\ a$, and provided with a pulley, $c''$, by means of which and the belt $c'''$ a rotary motion is imparted to the pulleys $c\ e$ from the pulley $b'''$ on the rotary driving-shaft $b$, as shown.

To obtain the proper tension on the studded endless belt $d$, the bearings $e''\ e''$ for the shaft $e'$ are made adjustable up and down in slotted openings $a'\ a'$ in the frames $a\ a$, as shown, and the inner ends, $f'\ f'$, of the lever $f$ rest against the under side of said adjustable bearings. The said lever $f$ is hung at the fulcrum $f''$, and provided in its outer end with an adjustable weight, $g$, that exerts a downward pressure on the outer part of the lever $f$, causing its inner ends, $f'\ f'$, to press upward against the bearings $e''\ e''$, and thereby cause the studded belt $d$ to remain taut and of the proper tension during the execution of the work.

$h$ represents a suitable fan or blower, set in a rotary motion by means of pulleys $h'\ h''$ and endless belt $h'''$, as shown, for the purpose of carrying away the dust from the machine, for which purpose the said fan or blower $h$ is provided with an open-mouthed receiver, $i$, at the rear of the pulley $c$, and with an exit-pipe, $i'$, as fully shown in Fig. 3.

Having thus fully described the nature, construction, and operation of my invention, I wish to secure by Letters Patent, and claim—

In combination with the endless studded belt $d$ $d'$ and its pulleys $c$ $e$, the adjustable bearings $e''$ $e''$, and lever $f$ $f'$ $f'$, with its weight $g$, as and for the purpose described.

In testimony whereof I have affixed my signature in presence of two witnesses.

JOSIAH W. ROGERS.

Witnesses:
 ALBAN ANDRÉN,
 NELLIE F. SAUL.